United States Patent
Casu et al.

(10) Patent No.: US 7,330,771 B2
(45) Date of Patent: *Feb. 12, 2008

(54) OPERATOR FOR EMBOSSING AND ENGRAVING PROFILES IN A SOLID BODY MODELING SYSTEM

(75) Inventors: Lucia Casu, East Palo Alto, CA (US); Kenneth Jamieson Hill, South Lyon, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/946,713

(22) Filed: Sep. 22, 2004

(65) Prior Publication Data

US 2005/0038548 A1 Feb. 17, 2005

Related U.S. Application Data

(63) Continuation-in-part of application No. 10/947,585, filed on Sep. 22, 2004, and a continuation-in-part of application No. 10/663,391, filed on Sep. 19, 2003, now Pat. No. 7,031,790.

(60) Provisional application No. 60/504,888, filed on Sep. 22, 2003, provisional application No. 60/504,887, filed on Sep. 22, 2003, provisional application No. 60/412,935, filed on Sep. 23, 2002.

(51) Int. Cl.
*G06F 19/00* (2006.01)
*G06T 17/00* (2006.01)

(52) U.S. Cl. .................................. 700/98; 345/420
(58) Field of Classification Search ............... 700/98, 700/118, 163

See application file for complete search history.

(56) References Cited

U.S. PATENT DOCUMENTS

| | | | | |
|---|---|---|---|---|
| 5,660,668 A | * | 8/1997 | Matheson et al. | 156/268 |
| 6,654,654 B1 | * | 11/2003 | Subrahmanyam et al. | 700/98 |
| 6,906,711 B2 | * | 6/2005 | Hill | 345/420 |
| 7,031,690 B2 | * | 4/2006 | Prodanov et al. | 455/338 |
| 2002/0113785 A1 | * | 8/2002 | Hill | 345/420 |
| 2005/0038540 A1 | * | 2/2005 | Hill et al. | 700/98 |

OTHER PUBLICATIONS

Bidarra, R., de Kraker, K.J., and Bronsvoor, W.F. "Representation and Management of Feature Information in a Cellular Model." Computer-Aided Design 30.4 (1998): 301-313.*

(Continued)

*Primary Examiner*—Ryan A. Jarrett
(74) *Attorney, Agent, or Firm*—Gates & Cooper LLP

(57) ABSTRACT

A computer-implemented solid modeling system performs an operation for embossing or engraving at least one profile onto or into a solid body. Generally, the profile comprises text or a planar geometric shape. Specifically, the profile is a planar face bounded by edges, or the profile is a set of planar faces sharing a common plane and having the same normal direction. In performing the operation, the profiles raise or lower regions of faces with respect to an underlying surface.

27 Claims, 17 Drawing Sheets

OTHER PUBLICATIONS

Bidarra, R., and Bronsvoort, W.F. "Semantic Feature Modeling." Computer-Aided Design 30.4 (2000): 201-225.*

Bronsvoort, W.F., Bidarra, R., and Noort, A. "Feature Model Visualization." Computer Graphics Forum 21.4 (2002): 661-673.*

Bidarra, R., Neels, W.J., and Bronsvoort, W.F. "Boundary Evaluation for a Cellular Model." Proceedings of the ASME Design Engineering Technical Conference (2003): 1-11.*

Gao S. and Shah, J.J. "Automatic Recognition of Interacting Machining Features Based on Minimal Condition Subgraph". Computer-Aided Design 30.9 (1998): 727-739.*

Floriani, L.D. "Feature Extraction from Boundary Models of Three-Dimensional Objects". Transactions On Pattern Analysis and Machine Intelligence 11.8 (1989): 785-798.*

ACIS 7.0 Online Help, Chapter 1, "Boolean Component". 2001. 19 pages.

* cited by examiner

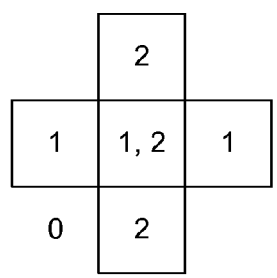
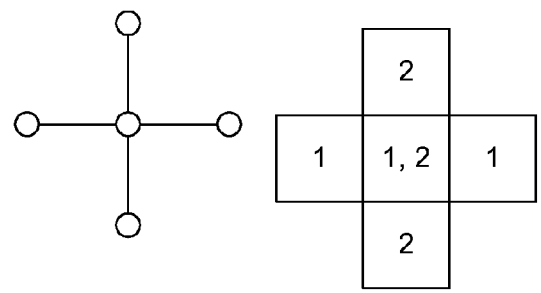
FIG. 10                    FIG. 11
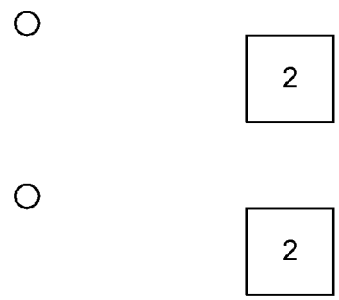
FIG. 12                    FIG. 13
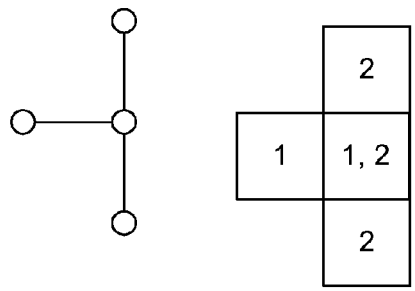
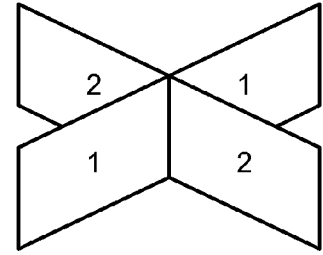
FIG. 14                    FIG. 15
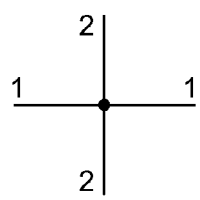
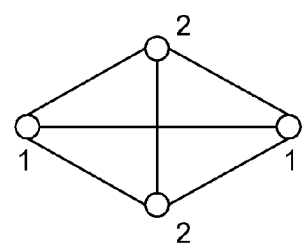
FIG. 16                    FIG. 17

OPERATOR FOR EMBOSSING AND ENGRAVING PROFILES IN A SOLID BODY MODELING SYSTEM

CROSS-REFERENCE TO RELATED APPLICATIONS

This application claims the benefit under 35 U.S.C. §119(e) of the following co-pending and commonly-assigned U.S. patent applications:

U.S. Provisional Patent Application Ser. No. 60/504,888, filed on Sep. 22, 2003, by Lucia Casu and Kenneth J. Hill, entitled "OPERATOR FOR EMBOSSING AND ENGRAVING PROFILES IN A SOLID BODY MODELING SYSTEM," and U.S. Provisional Patent Application Ser. No. 60/504,887, filed on Sep. 22, 2003, by Kenneth J. Hill and Richard S. Brandt, entitled "REPLACE FACE OPERATOR FOR SOLID BODY MODELING,"

which applications are incorporated by reference herein.

This application is a continuation-in-part and claims the benefit under 35 U.S.C. §120 of the following co-pending and commonly-assigned U.S. patent applications:

U.S. Utility Patent Application Ser. No. 10/663,391, filed on Sep. 16, 2003, by Kenneth J. Hill, entitled "OPERATOR FOR SCULPTING SOLIDS WITH SHEET BODIES," which application claims the benefit under 35 U.S.C. §119(e) of co-pending and commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES;" and U.S. Utility Patent Application Ser. No. 10/947,585, filed on Sep. 22, 2004, by Kenneth J. Hill and Richard S. Brandy, entitled "REPLACE FACE OPERATOR FOR SOLID BODY MODELING," which application claims the benefit under 35 U.S.C. §119(e) of co-pending and commonly assigned U.S. Provisional Patent Application Ser. No. 60/504,887, filed on Sep. 22, 2003, by Kenneth J. Hill and Richard S. Brandt entitled "REPLACE FACE OPERATOR FOR SOLID BODY MODELING;"

which applications are incorporated by reference herein.

BACKGROUND OF THE INVENTION

1. Field of the Invention

The present invention relates generally to computer-assisted design (CAD) systems, and in particular, to a graph-based method for embossing and engraving profiles in a solid body system.

2. Description of the Related Art

Over the last decade, designers have changed their fundamental approach to graphics design, moving from two-dimensional (2D) drawing systems to three-dimensional (3D) solid modeling systems. New software makes solid modeling technology available and affordable to virtually anyone.

Solid modeling is a technique that allows designers to create dimensionally accurate 3D solid models in a 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, chamfers, etc. The geometry of the parametric feature-based model is defined by underlying mathematical relationships (i.e., parameters) rather than by simple unrelated dimensions, which makes them easier to modify. These systems preserve design intent and manage it after every change to the model.

An operation that is needed by solid modeling systems is the ability to emboss or engrave profiles in a solid body. However, such an operation is non-trivial. Nonetheless, the present invention satisfies this need.

SUMMARY OF THE INVENTION

To address the requirements described above, the present invention discloses a computer-implemented solid modeling system that performs an operation for embossing or engraving at least one profile onto or into a solid body. Generally, the profile comprises text or a planar geometric shape. Specifically, the profile is a planar face bounded by edges, or the profile is a set of planar faces sharing a common plane and having the same normal direction. In performing the operation, the profiles raise or lower regions of faces with respect to an underlying surface.

BRIEF DESCRIPTION OF THE DRAWINGS

Referring now to the drawings:

FIG. 10 illustrates two-dimensional intersecting bodies;

FIG. 11 illustrates how a join operation keeps all cells in a cellular topology graph;

FIG. 12 illustrates how a subtract operation keeps only the 2 vertices;

FIG. 13 illustrates how an intersect operation keeps only the 1, 2 vertex;

FIG. 14 illustrates a selective Boolean removing only one cell;

FIG. 15 shows the cellular topology of two intersecting (edge aligned) sheets;

FIG. 16 shows a two-dimensional analog of FIG. 15;

FIG. 17 is a cellular topology graph for the configuration of FIG. 15;

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a parametric, feature-based solid modeling system that provides an operator for embossing and engraving a solid body (hereinafter referred to as an "emboss operator," "emboss operation," or simply "emboss").

Hardware and Software Environment

Figure 1:
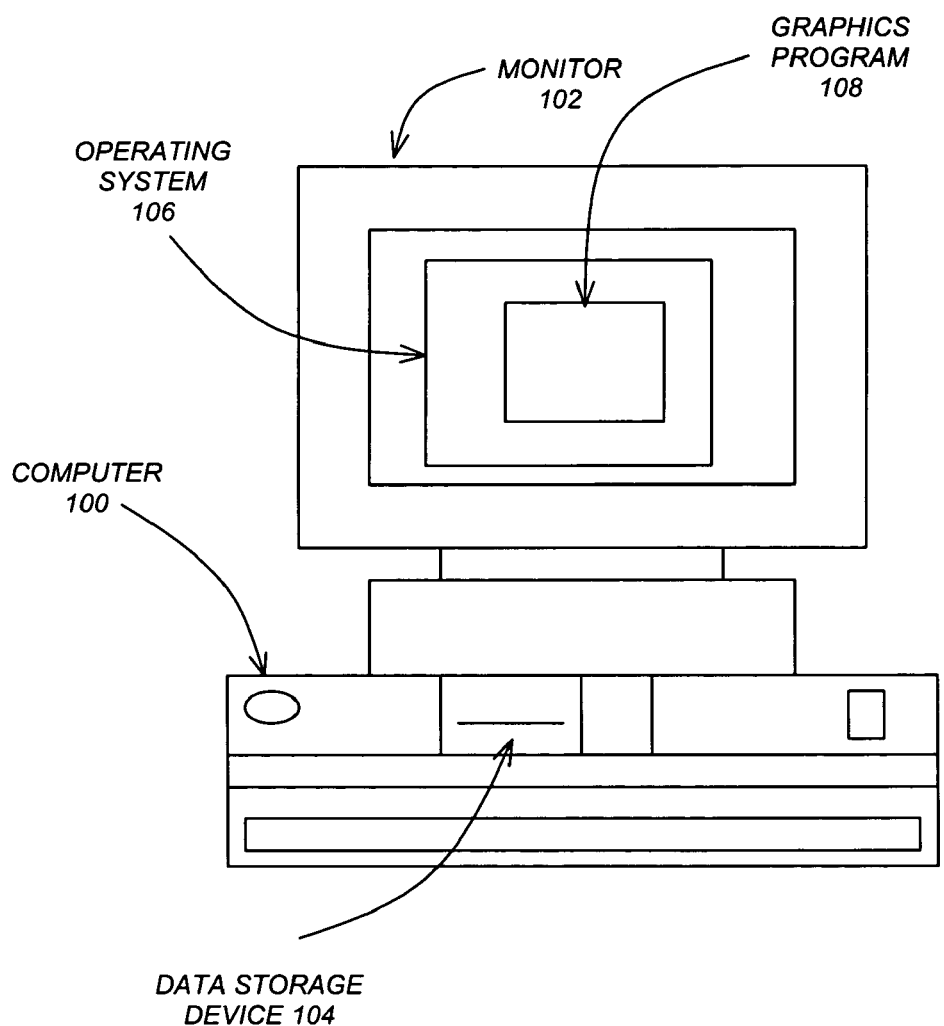
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106. The graphics program 108 preferably comprises a parametric feature-based solid modeling system, although other graphics programs 108 could be used as well.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
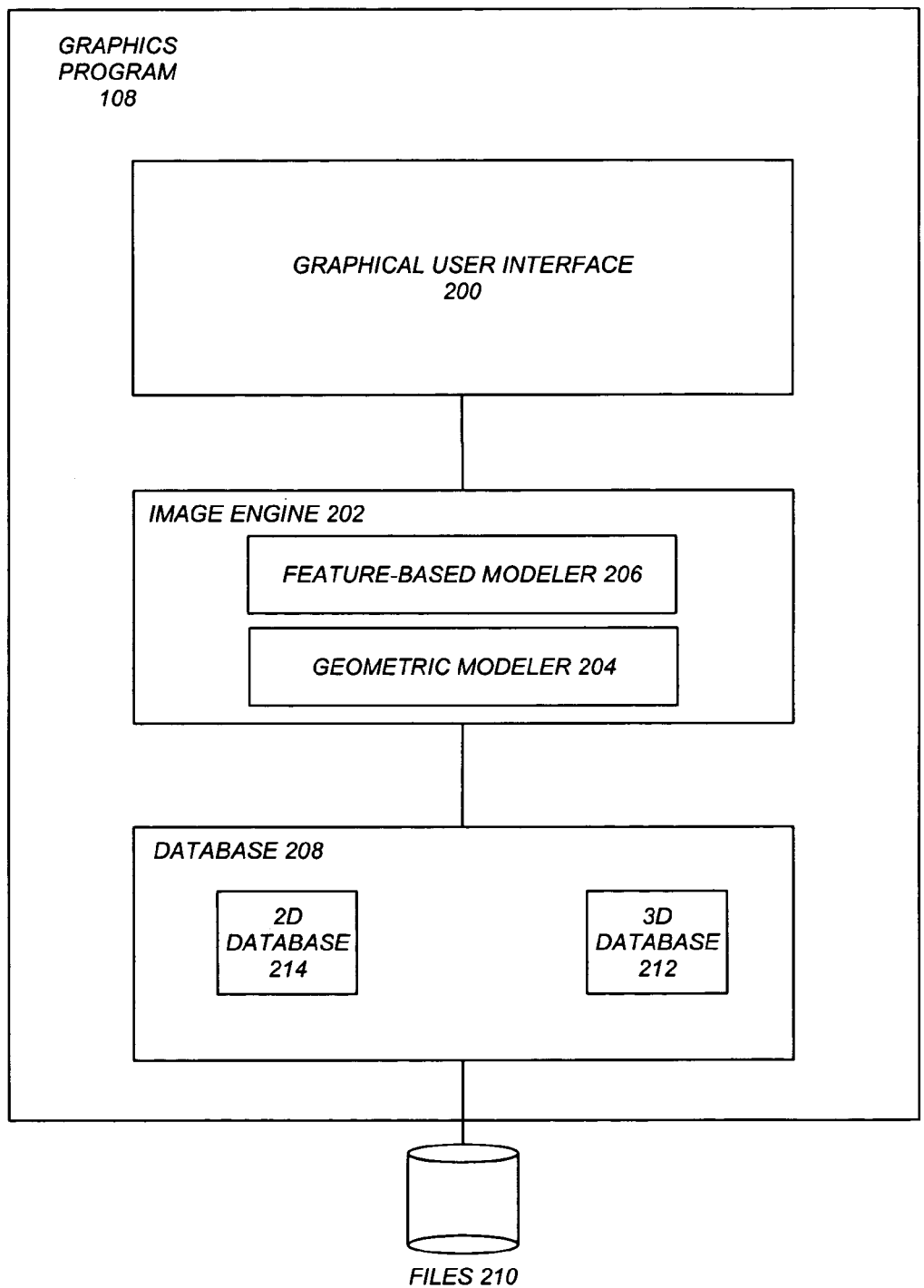
FIG. 2 is a block diagram that illustrates the components of the graphics program 108 according to the preferred embodiment of the present invention.

FIG. 2 is a block diagram that illustrates the components of the graphics program 108 according to the preferred embodiment of the present invention. There are three main components to the graphics program 108, including: a Graphical User Interface (GUI) 200, an Image Engine (IME) 202 including a Geometric Modeler (GM) 204 and Feature-Based Modeler (FM) 206, and a Database (DB) 208 for storing objects in files 210.

The Graphical User Interface 200 displays information to the user and provides the functionality for the user's interaction with the graphics program 108.

The Image Engine 202 processes the Database 208 or files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
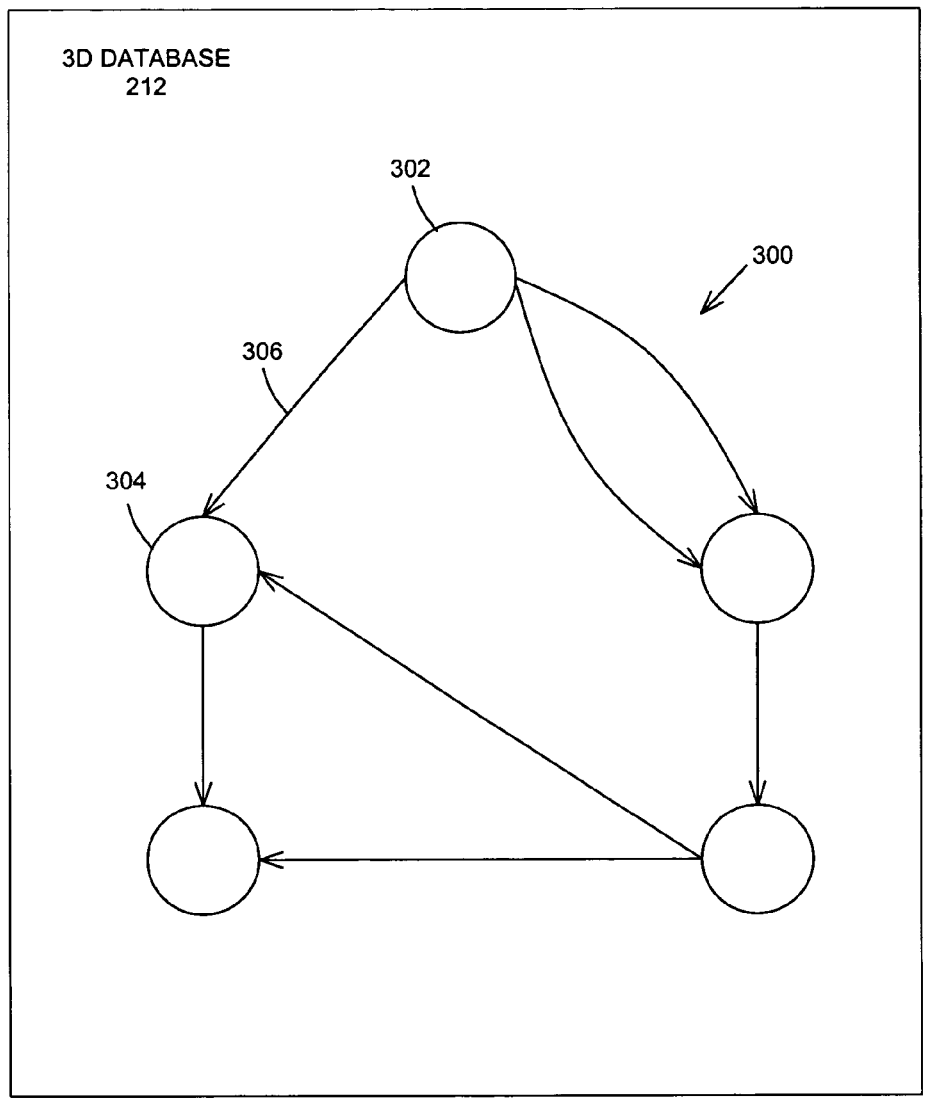
FIG. 3 is a block diagram that illustrates an object structure maintained by a three dimensional database according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D database 212. Moreover, a node 304 may be a member of multiple structures 300 in the 3D database 212.

Operation of the Preferred Embodiment

Boundary Representations (B-Reps)

A solid is represented in the Feature-Based Modeler 206 by means of a boundary representation (b-rep) model. The boundary representation comprises a hierarchy of topological objects that define the boundaries of successively simpler elements of the model.

Each solid is comprised of disconnected parts called "lumps." Most solids have only one lump, although most boundary representation models allow solids to have multiple lumps.

Figure 4:
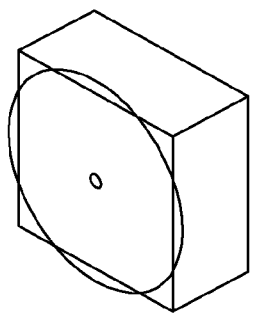
FIG. 4 illustrates how multi-lump bodies can be created.
Figure 5:
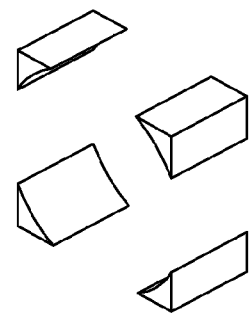
FIG. 5 illustrates a multi-lump body.

FIGS. 4 and 5 illustrate how multi-lump bodies can be created. For example, in FIG. 4, a circular profile could be extruded through a body with a "cut" operation. The result is the multi-lump body of FIG. 5.

Each lump contains one or more "shells." These shells are comprised of a collection of faces that separates the inside portion of the lump from the outside. A lump can have several shells. There is typically an exterior shell which bounds the infinite void from the material, but there may also be interior shells which separate the material from pockets of empty space.

Each shell contains a set of one or more "faces." These faces are the infinitely thin boundaries between what is inside the solid and what is outside. A spherical lump might have only one face (on the one shell), or its surface might be chopped up into a patchwork of faces. A cube typically has six faces, but could have more if some of the sides are split. Each face is required to be smooth in the sense that there are no sharp ridges in the interior of the face. Underlying each face is a surface that represents the geometry associated with the face. The surface gives the face structure.

In some b-rep models, there is a topological entity called a "half-face" that determines what side of the face is considered outside of the lump. Other b-rep models describe half-faces as special faces. When half-faces are present, the shells are comprised of half-faces, and the half-faces are associated to a face.

Each face is bounded by zero or more loops. A loop is to a face what a shell is to a lump. A spherical face might have no loops. The side of a block typically has one loop. A side of a cube with a round hole in it has two loops: one for the square outer boundary of the face, one for the round hole.

Each loop is comprised of multiple "half-edges" (often called "co-edges" or "fins"). These half-edges represent the usage of an edge (the next lower topological item) by a face. The half-edge answers the question "does the loop traverse an edge in the same parametric direction of the edge, or in the reverse direction?"

Associated with each half-edge is an "edge." An edge can be thought of as being an infinitely thin wire. Each edge has a direction of traversal based on the underlying mathematical equation of the curve associated with the edge.

Edges are bounded by zero, one, or two "vertices." Vertices connect a physical point as a termination to an edge.

Figure 6:
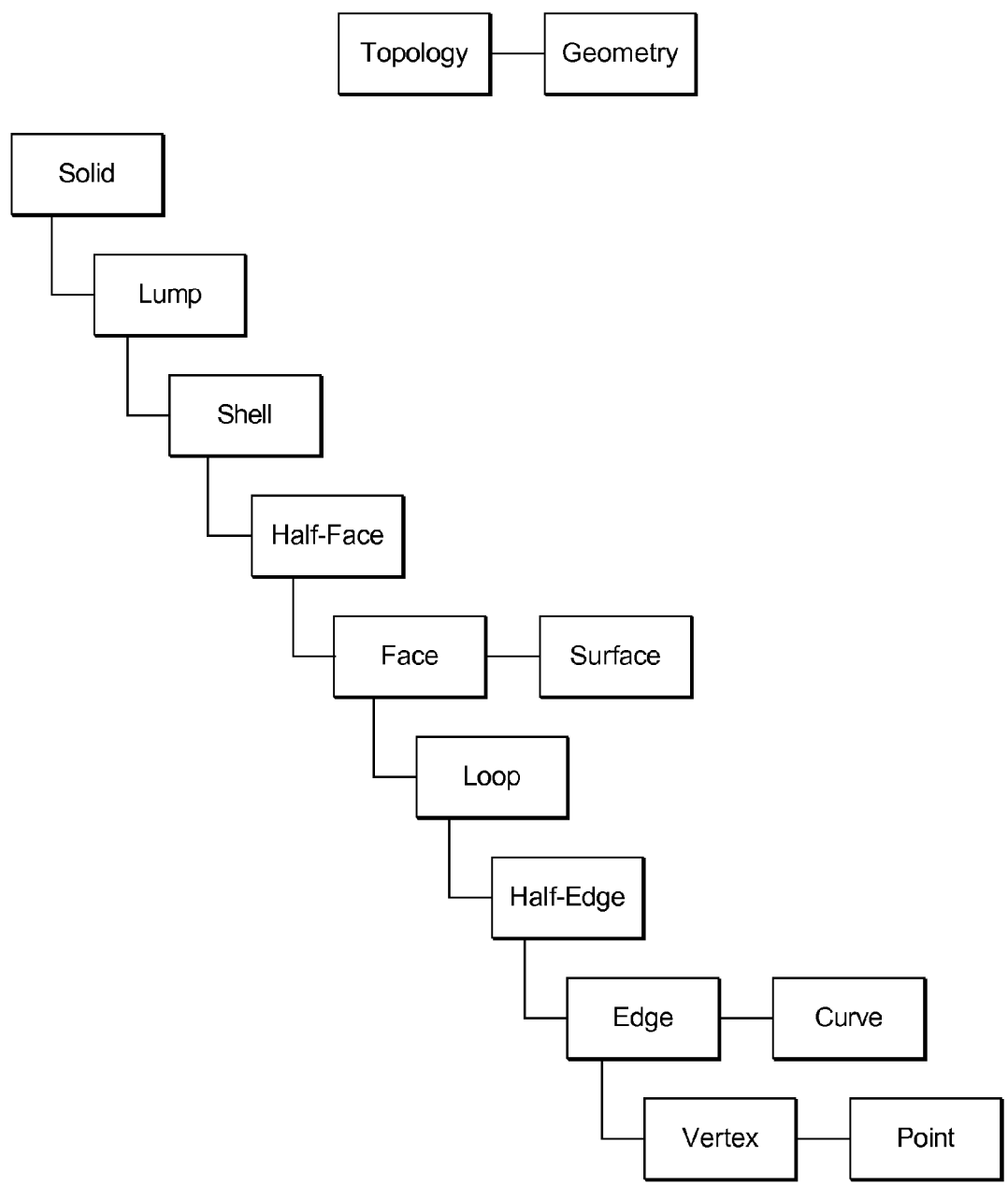
FIG. 6 is a topology chart of a hierarchy of topological entities used to represent a solid and their associated geometry entities.

The topology chart of FIG. 6 shows the hierarchy of topological entities used to represent a solid and their associated geometry entities: solid, lump, shell, half-face, face/surface, loop, half-edge, edge/curve, and vertex/point.

A sheet may also be defined using a boundary representation. Unlike a solid, a sheet is infinitely thin and has no volume. In some modelers, each face in a sheet has two half-faces (one for each side); in other modelers, each face is marked as a double-sided.

Attributes

The Feature-Based Modeler 206 has the ability to attach data to topological entities. Each such datum is usually called an "attribute." Attributes typically have programmable behaviors so that they can respond appropriately to common operations such as splitting, merging, copying, or transforming the entity to which they are attached. For example, to track how a certain face is split during a Boolean operation, an attribute can be placed on that face with the following behaviors:

Split behavior: Each resultant face gets a copy of the attribute.

Merge behavior: If either of the two faces being merged has the attribute, then the resultant face has a copy of the attribute.

Copy behavior: This behavior is not usually encountered in a Boolean operation.

Transform behavior: This behavior is not usually encountered in a Boolean operation.

After the Boolean operation is completed, all faces are examined to see which ones contain the attribute.

Suppose that the system needs to track two faces, one of type A and one of type B. An attribute could be created for each type to track, but a more compact way of doing it is to create an attribute (perhaps called AttribFaceTrack) with two Boolean data members (data items containing true or false values). These data members can be distinct bits of a single machine word, for example, wherein the first bit indicates whether the face is of type A, and the second bit indicates whether the face is of type B. The merge behavior could then be changed so that if each of the merging faces has an attribute of type AttribFaceTrack but with different faces indicated, the attribute on the resultant face has both faces indicated. After the Boolean operation, some faces will have no attribute of type AttribFaceTrack, some will have type A indicated, some will have type B indicated, and others will possibly have type A and B indicated.

This multi-face tracking behavior will be used in a slightly more complex form to perform the emboss operator of the present invention.

Cellular Topology

When speaking of the physical world, one expects that two bodies will not occupy the same space at the same time. In the symbolic world, there is no such restriction. When solids intersect, space is divided into the following types of disjoint regions: regions that are outside of both bodies (called "the void"); regions that are inside the first body, but outside the second; regions that are inside the second body, but outside the first; and regions that are inside both bodies. The disjoint regions, interior to at least one of the solids, are called "cells." There may be more than one cell of the same type.

Figure 7:
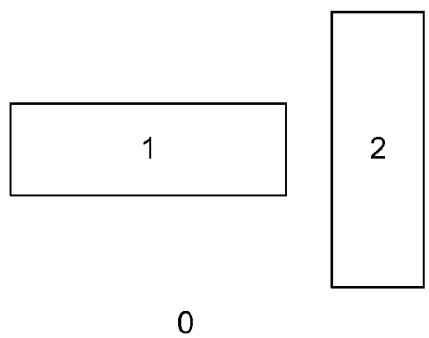
FIG. 7 illustrates how, in two dimensions, two disjoint regions form three types of regions (marked 0, 1, 2)
Figure 8:
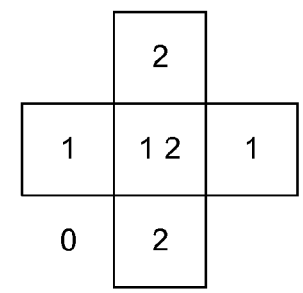
FIG. 8 illustrates how four types of regions are formed when the regions intersect.

FIG. 7 illustrates this concept. In two dimensions, two disjoint regions form three types of regions (marked 0, 1, 2). FIG. 8 illustrates how four types of regions are formed when the regions intersect. Moreover, five cells are formed in FIG. 8.

Two cells are called "adjacent" if they share at least one common face. In the two dimensional analogs that will be frequently used herein for illustration purposes (e.g. FIG. 8), cells will be adjacent when separated by a common edge.

Figure 9:
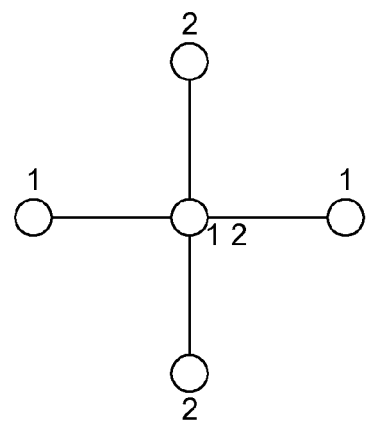
FIG. 9 is a cellular topology graph for FIG. 8.

From the cells of intersecting bodies and the notion of adjacency, one may use graph theory to generate a useful abstraction of the connectivity of the cells. Let each cell (other than the void cells) be represented as a vertex on the graph (not to be confused with the b-rep vertices) and let two vertices be connected by an edge (again, not a b-rep edge) if and only if the cells associated with those vertices are adjacent. The resulting graph is called a "cellular topology graph" or simply a "ct-graph." For example, FIG. 9 is a ct-graph for FIG. 8.

One can augment the ct-graphs by labeling the vertices by their kind: 1 if the associated cell is in the first body, 2 if in the second body, and 1,2 if the associated cell is in both bodies.

Selective Boolean Operations on Two Solid Bodies

A "Boolean operation" between two bodies creates a new solid from portions of each body, wherein the body being modified is called the "blank body," and the body doing the modification is called the "tool body." After a "join" Boolean operation, the blank body is modified to contain all the material from both the original blank body and the tool body. After a "subtract" Boolean operation, the entire material interior to the tool body is removed from the blank body. An "intersect" Boolean operation replaces the blank body with only that material which is in both the tool body and the original blank body.

Each of the Boolean operations types presented above can be represented in terms of cellular topology. The system creates the ct-graph for the intersecting bodies, and then decides which vertices of the ct-graph to keep. If a particular vertex present in the resulting ct-graph is kept, then its associated cell is present in the resulting solid. In this application, the convention is that the tool body is associated with the "1" vertices and the blank body is associated with the "2" vertices.

FIGS. 10, 11, 12 and 13 illustrate these operations. FIG. 10 illustrates the 2D intersecting bodies, FIG. 11 illustrates how a join operation keeps all cells in the ct-graph, FIG. 12 illustrates how a subtract operation keeps only the "2" vertices, and FIG. 13 illustrates how an intersect operation keeps only the "1,2" vertex.

There may be times when operations other than the three above are needed. When this is occurs, an algorithm may choose to do a "selective Boolean" in which the algorithm explicitly selects which vertices (and therefore which cells) are kept. For example, perhaps it is desired to keep all the cells except the right "1" vertex. Removing one vertex from the ct-graph can do this, as shown in FIG. 14, which illustrates a selective Boolean removing only one cell.

Selective Boolean Operations on Two Sheet Bodies

A selective Boolean on two sheet bodies produces a ct-graph, wherein the vertices represent cells and the edges represent the connectivity between the cells. The cells are not bounded regions of space as in the solid selective Boolean, but rather bounded subsets of the original sheets.

As in the description of selective Boolean operations on two solid bodies, selective Boolean operations on sheets can be described using planar analogs. Curves on the plane represent cells and hence are vertices in the ct-graph, while the junctions between these curves are the connective entities and therefore represent the edges of the ct-graph.

For example, FIG. 15 shows the cellular topology of two intersecting (edge aligned) sheets. FIG. 16 shows a 2D analog of FIG. 15 and FIG. 17 is a ct-graph for the configuration of FIG. 15. Note that each face in FIG. 15 connects to every other face (through the edge of intersection), and thus the ct-graph of FIG. 17 is fully connected.

Selective Boolean Operations on One Solid and One Sheet Body

When a selective Boolean operation is performed on a solid body and a sheet body, the faces of the sheet body may separate the solid into regions of space such that the regions are separated from each other by faces from the sheet body.

This can be discussed using a 2D analog. Solid bodies are represented in 2D as regions and sheet bodies as curves.

Figure 18:
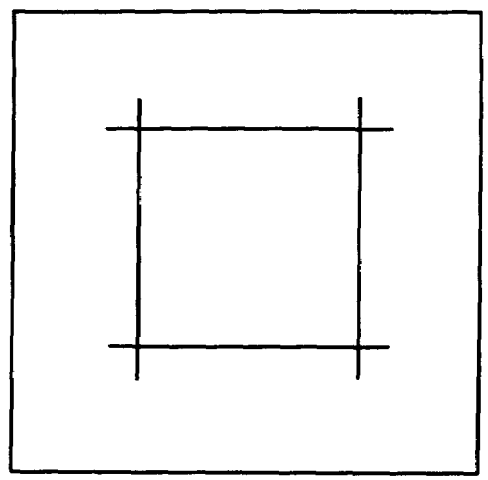
FIG. 18 shows the cellular topology of a solid and an intersecting set of four sheets.

FIG. 18 shows the cellular topology of a solid and an intersecting set of four sheets. Each line within the cube represents an individual sheet body. The analogous 3D figure would contain an outer cube, and six intersecting planar faces bounding an inner cube.

Figure 19:
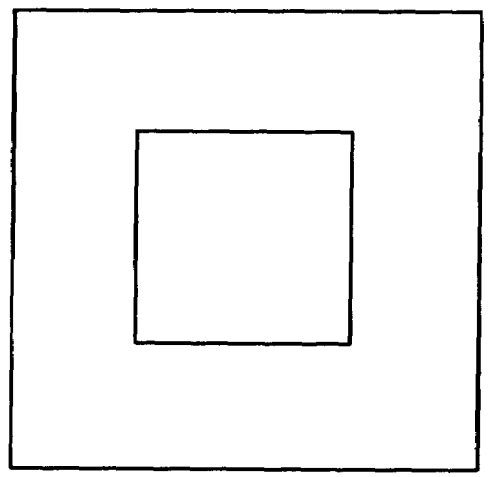
FIG. 19 shows how two solid cells are created, one inside the other.

FIG. 19 shows how two solid cells are created, one inside the other. Notice that the portions of the sheet body that did not contribute to the separation (the "overhangs") have been removed. The outer cell has a square hole in it, the inner cell is precisely fills the hole. For the analogous 3D figure, there would be a cubical cell with a cubical void in its center, and another smaller cubical cell that precisely fills that void.

Figure 20:
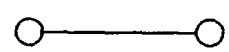
FIG. 20 illustrates a cellular topology graph for FIG. 18.

FIG. 20 illustrates a ct-graph for FIG. 18.

An Operator for Embossing and Engraving

The present invention is an operator for embossing and engraving at least one profile, such as text or other planar geometric shapes, onto or into a solid body in a computer-implemented solid body modeling system. A profile in this context is defined as a planar face bounded by edges or a set of planar faces sharing a common plane and having the same normal direction.

From a technology perspective, the result of an emboss operation are regions of faces that are raised or recessed.

From the user's perspective, an emboss operation has certain characteristics:
  it is a profile used to physically raise or lower regions of faces with respect to an underlying surface,
  it can provide a surface for a decal or painting, and
  it can provide clearance for another component in an assembly.

In this context, the emboss operation creates a relief or boss of a profile.

Cases of Physical Representation

Figure 21B:
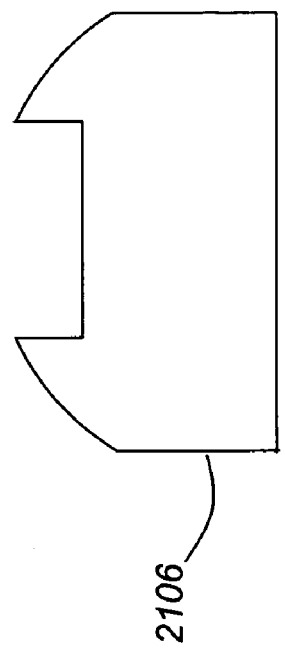
FIGS. 21A-21B, 22A-22B and 23A-23B illustrate cross-sections of first, second and third emboss configurations, respectively, according to one embodiment of the present invention.
Figure 21A:
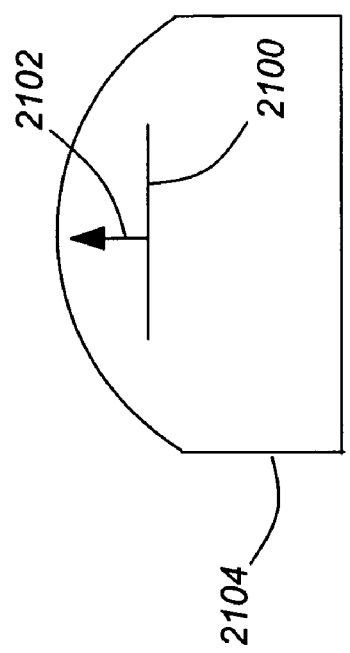

FIGS. 21A and 21B illustrate a cross-section of a first emboss configuration according to one embodiment of the present invention. Planar profile 2100 with plane normal vector 2102 is interior to target body 2104. The emboss operator removes material to form body 2106.

Figure 22B:
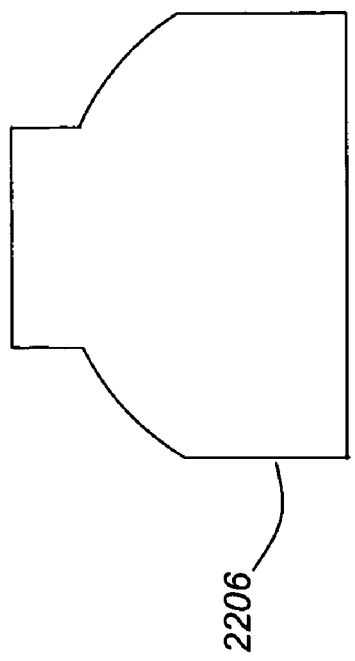
Figure 22A:
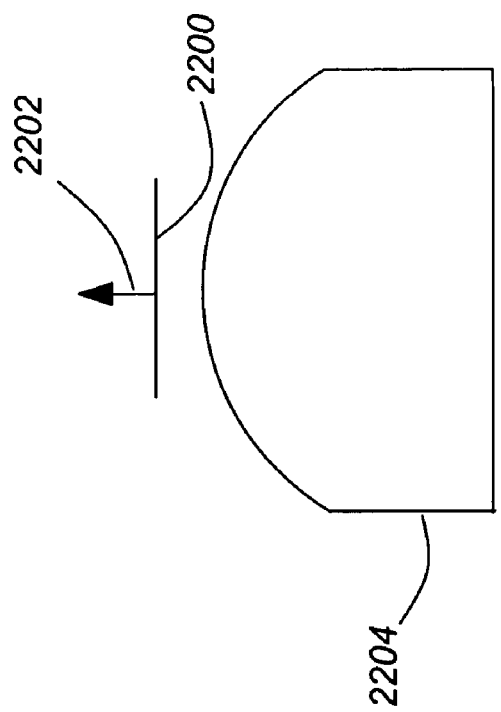

FIGS. 22A and 22B illustrate a cross-section of second emboss configuration according to one embodiment of the present invention. Planar profile 2200 with plane normal vector 2202 is exterior to the target body 2204. The emboss operator adds material to form body 2206.

Figure 23B:
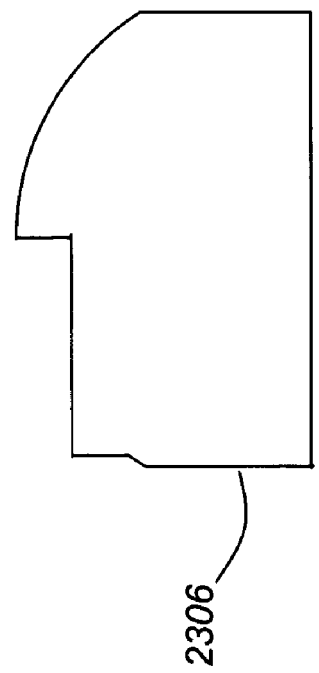
Figure 23A:
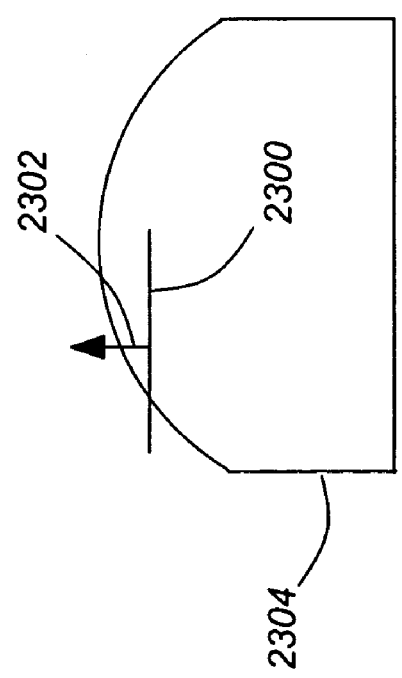

FIGS. 23A and 23B illustrate a cross-section of third emboss configuration according to one embodiment of the present invention. Planar profile 2300 with plane normal vector 2302 is partially interior and partially exterior to the target body 2304. The emboss operator both adds and removes material to form body 2306.

Comparison with the Replace Face Operator

The logic of the emboss operator of the present invention is similar to that found in co-pending and commonly-assigned U.S. Utility Patent Application Ser. No. 10/947,585, filed on Sep. 22, 2004, by Kenneth J. Hill and Richard S. Brandt, entitled "REPLACE FACE OPERATOR FOR SOLID BODY MODELING," (hereinafter referred to as the "replace face operator"), which application claims the benefit under 35 U.S.C. §119(e) of co-pending and commonly assigned U.S. Provisional Patent Application Ser. No. 60/504,887, filed on Sep. 22, 2003, by Kenneth J. Hill and Richard S. Brandt, entitled "REPLACE FACE OPERATOR FOR SOLID BODY MODELING," as well as U.S. Utility Patent Application Ser. No. 10/663,391, filed on Sep. 16, 2003, by Kenneth J. Hill, entitled "OPERATOR FOR SCULPTING SOLIDS WITH SHEET BODIES," and (hereinafter referred to as the "sculpting operator"), which application claims the benefit under 35 U.S.C. §119(e) of co-pending and commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," all of which applications are incorporated by reference herein.

However, there are a number differences between the present invention and the replace face operator. These differences are enumerated below:

1. Inputs to the emboss operator:
   a. The inputs to the emboss operator includes a set of faces known as "profile faces" representing the presentation faces of the emboss. This collection of faces are marked as incoming faces and serve the same function as incoming faces in the replace face operator. The incoming faces should be oriented consistently; that is, their normals should all point in roughly the same direction. If they are co-planar faces, then their normals should point in the same direction.

b. A direction, one of the three options: "normal", "anti-normal" or "both".

2. A "cutter" is created from the incoming faces by adding faces around the edges of the incoming faces. These added faces form the walls of the emboss. These added faces are marked as "side faces" (with an attribute). They serve the same function as the "extended faces" in the replace face operator.

3. The web body is created as a non-regular union of the cutter and the original target body (converted to a 2D manifold, i.e., a "hollowed out solid"). This is similar to the replace face operator, which creates the web body as a non-regular union of the extension faces, incoming faces, and original solid body (converted to a 2D manifold).

4. A major part of the replace face operator deals with simplifying the web body. No such simplification is necessary for this invention.

5. Outgoing faces are automatically selected by this invention. In contrast, the replace face operator requires the outgoing faces be selected as an input to the operation.

6. Special processing is done before cell selection if the direction is "both". (Cell selection is called "cell-culling" in the replace face operator.)

7. In some cases, the cell-selection criteria are different for this invention as compared to the replace face operator.

Logic of the Emboss Operator

Figure 24:
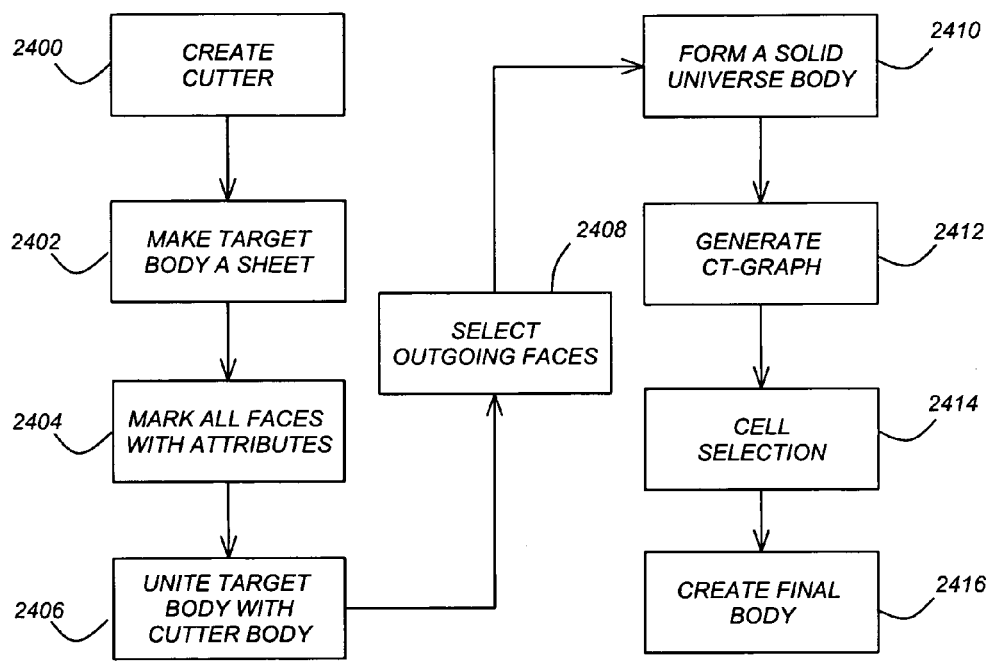
FIGS. 24, 25, 26 and 31 are flowcharts that illustrate the logic performed according to the preferred embodiment of the present invention.

FIG. 24 is a flowchart that illustrates the logic performed according to the preferred embodiment of the present invention.

Block 2400 represents the step of creating the cutter body. This Block is described in more detail below as the Create Cutter in FIG. 25.

Block 2402 represents the step of making the target body a sheet, by making all the faces double-sided. This essentially turns the solid body comprising the target body into an empty shell.

Block 2404 represents the step of marking all the faces of the target body with attribute Part Face to identify the faces as coming from the target body. These attributes must have merge and split semantics which migrate the attributes properly during the following Boolean operation. After the Boolean operation, each face must know where it came from.

Block 2406 represents the step of performing a non-regularized-unite of the target body and the cutter body. The result of this Boolean operation is a collection of faces that have split each other, which is known as the web body.

Block 2408 represents the step of selecting outgoing faces of the web body, and marking them with an attribute "Outgoing Face". This Block is described in more detail below as the Select Outgoing Faces in FIG. 26.

Block 2410 represents the step of forming a solid universe body large enough to completely enclose the web body.

Block 2412 represents the step of generating a ct-graph from the web body and universe body, wherein this operation is also known as a first stage of the selective Boolean operation.

Block 2414 represents the step of performing cell selection by examining the ct-graph to determine what cells to keep and what cells to discard by performing cell culling, in order to generate a final graph (i.e., a graph of cells to keep) for the resulting solid body. This Block is described in more detail below as the Cell Selection in FIG. 31.

Block 2416 represents the step of performing a "second stage" of the selective Boolean operation in order to create a final body from the final graph.

Create Cutter

Figure 25:
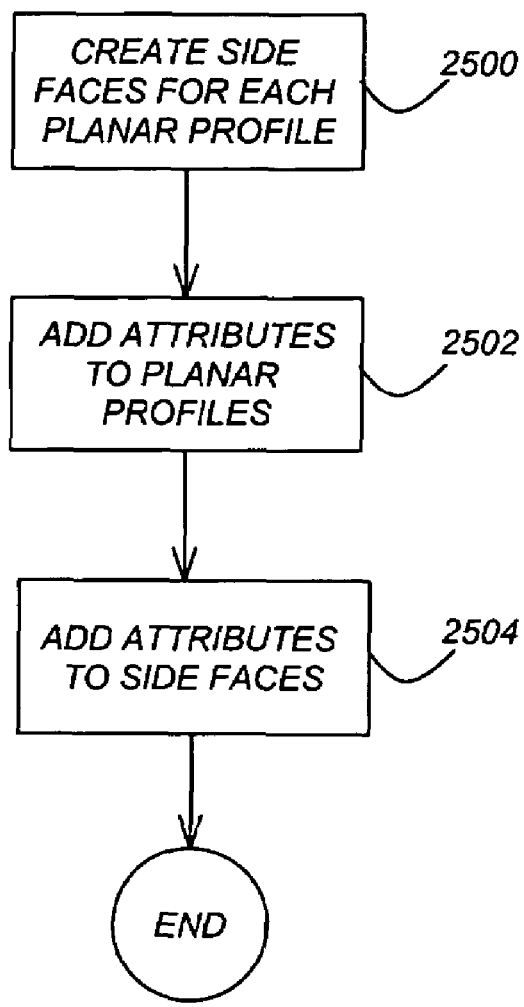

FIG. 25 is a flowchart that illustrates the logic performed according to the preferred embodiment of the present invention.

Block 2500 represents the cutter body being created by creating side faces for each planar profile, i.e., by attaching the profile faces to side faces. If the direction flag is Normal, then the side faces are created on the anti-normal side of the incoming face. If the direction is Anti-normal, then the side faces are created on the normal side of the incoming face. If the direction is Both, then the side faces are created on both sides of the incoming face.

Each side face shares an edge with one profile face. Typically, the face normal of the side faces are at a constant angle from the incoming faces to which they are adjacent. This constant angle is often 90°, but might be other values to apply a taper or draft to the sides of the emboss. Other schemes for choosing side faces may be used without departing from the scope of this invention.

If the direction option is normal or anti-normal, then there exists one side face set. If the direction option is both, then there are two side face sets, i.e., one on the normal side of the incoming faces, and one on the anti-normal side.

Each side face set has the following properties:

If two edges of an incoming face are adjacent, then the side faces attached to those edges must share a common edge; that is, they must be adjacent.

The side face normals should be oriented consistently; that is, they may not change direction as one passes from one side face to the next.

The side face normals should point away from any regions of space that should be affected by the emboss operation. Only cells on the anti-normal side of side faces will be affected by the emboss operation.

Block 2502 represents attribute Incoming Face being added to the planar profiles.

Block 2504 represents attribute Side Face being added to the side faces. These serve the same purpose as "Extension Face" in the replace face operator, but are not, in fact, extensions of existing faces and have therefore been renamed.

See FIGS. 1-13 of U.S. Provisional Patent Application Ser. No. 60/504,888, filed on Sep. 22, 2003, by Lucia Casu and Kenneth J. Hill, entitled "OPERATOR FOR EMBOSSING AND ENGRAVING PROFILES IN A SOLID BODY MODELING SYSTEM," which application is incorporated by reference herein, for illustrations of various cutter bodies.

Select Outgoing Faces

Figure 26:
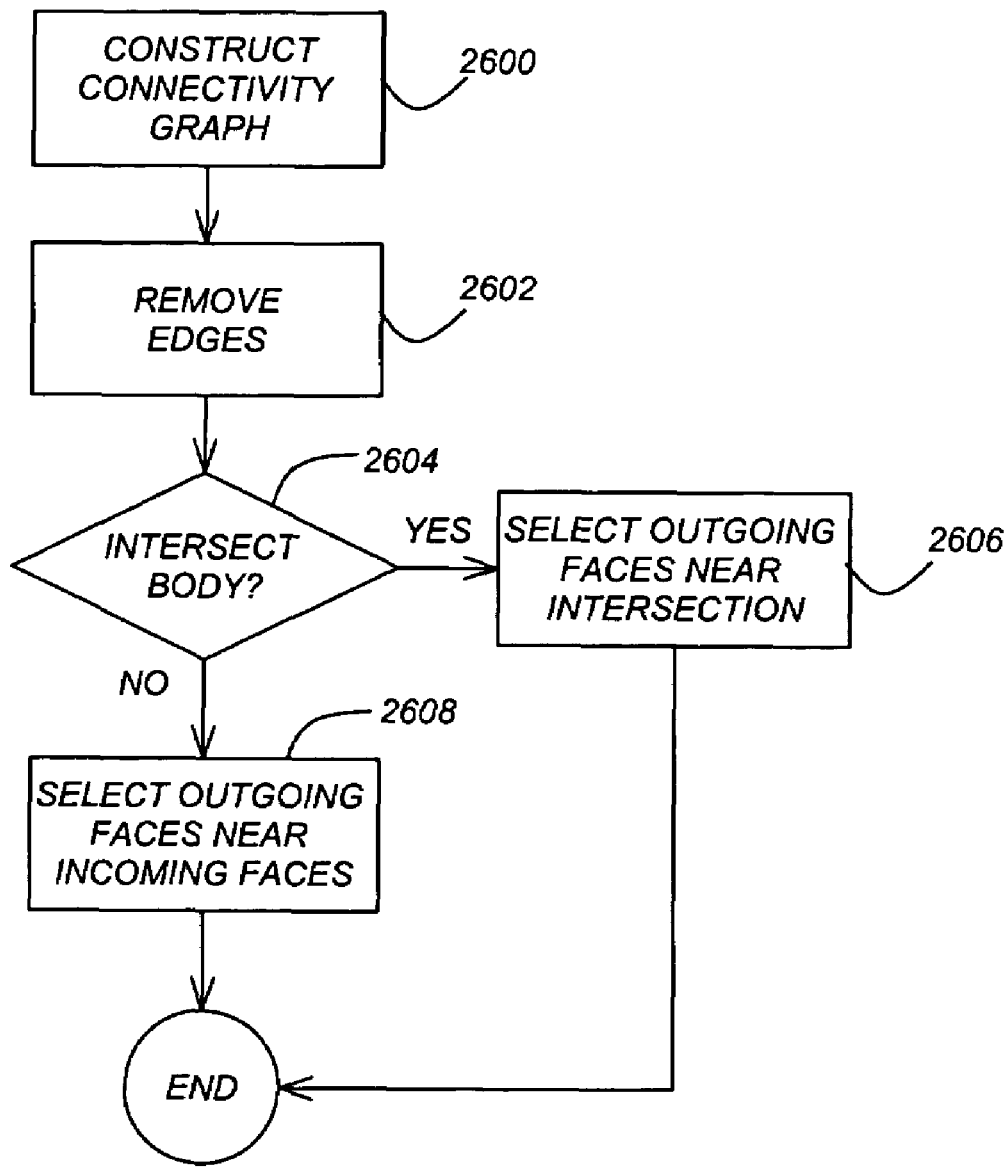

FIG. 26 is a flowchart that illustrates the logic performed according to the preferred embodiment of the present invention.

Block 2600 represents the emboss operator constructing a multi-level connectivity graph for the faces and edges of the original solid body. Faces of the part body have been previously marked with attributes, as described in the replace face operator.

A multi-level connectivity graph includes nodes for entities from various topological levels. Nodes represent the topological entities, and arcs represent the abstraction "incident." Arcs are only created between entity types that are adjacent on the topological hierarchy for the types in the graph. ("Node" and "arc" are used as alternative names for graph vertices and graph edges, to avoid confusion with the boundary representation topology of the same name.)

For example, for a connectivity graph with faces, loops, and edges, faces may be adjacent to loops, and loops to edges, but never faces to faces, faces to edges, or edges to edges. In another example, for a connectivity graph with only faces and edges, each graph arc represents a face-edge pair.

Multi-level connectivity graphs include some helpful properties. One property is that they retain information about connectivity between entities. Another property is that subtraction of graphs of different topological orders is a useful operation, as illustrated in FIGS. 27, 28, 29 and 30.

Figure 27:
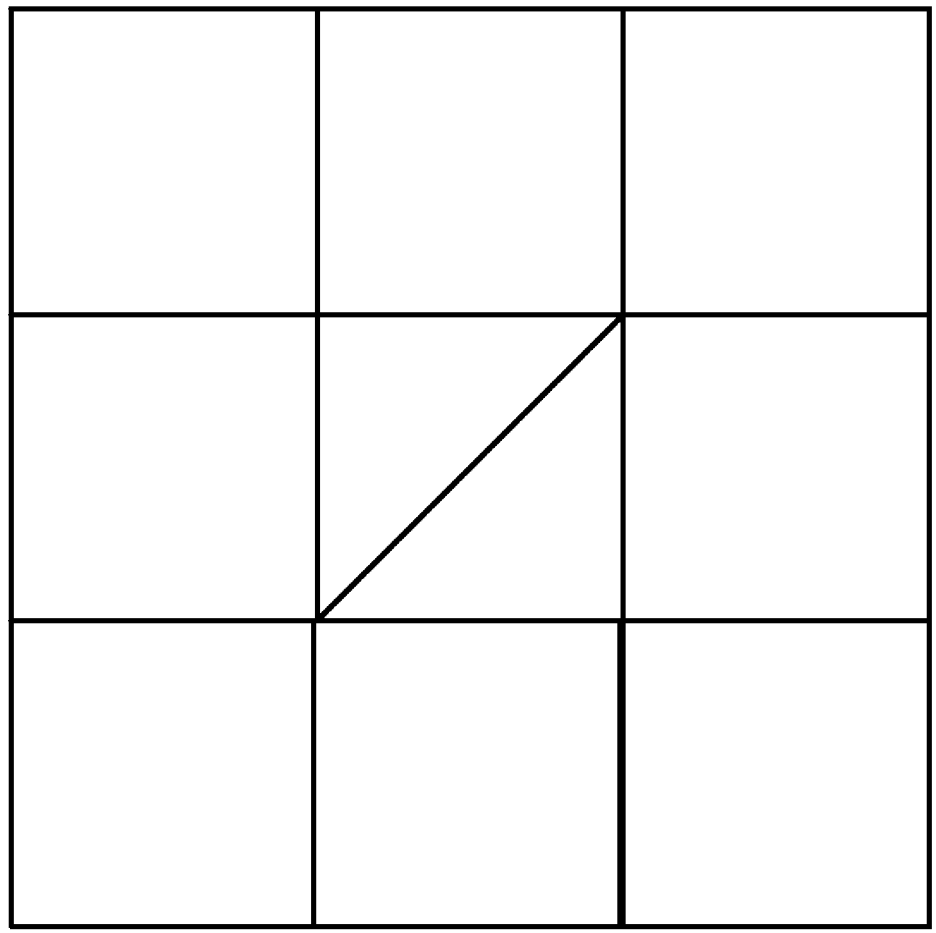
FIG. 27 illustrates a quilt of faces and edges according to one embodiment of the present invention.
Figure 28:
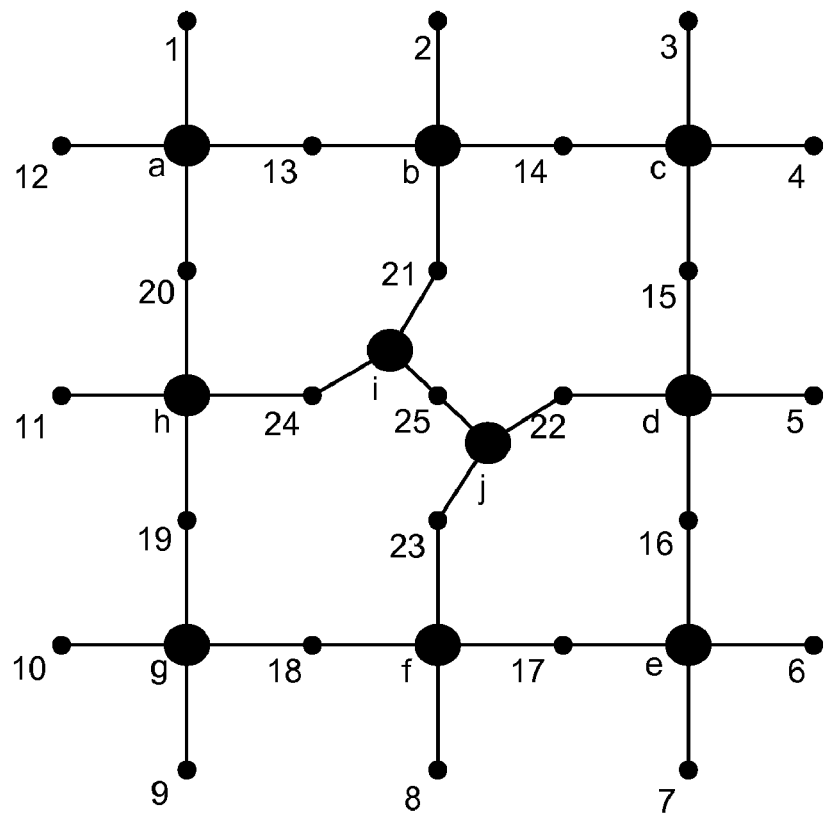
FIG. 28 is a multi-level connectivity graph of faces corresponding to FIG. 24.
Figure 29:
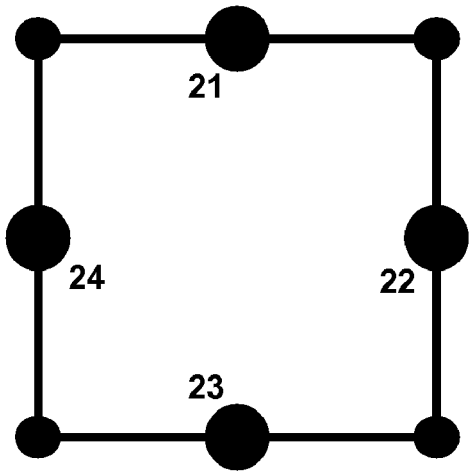
FIG. 29 is an edge-vertex graph for a central square of FIG. 25.
Figure 30:
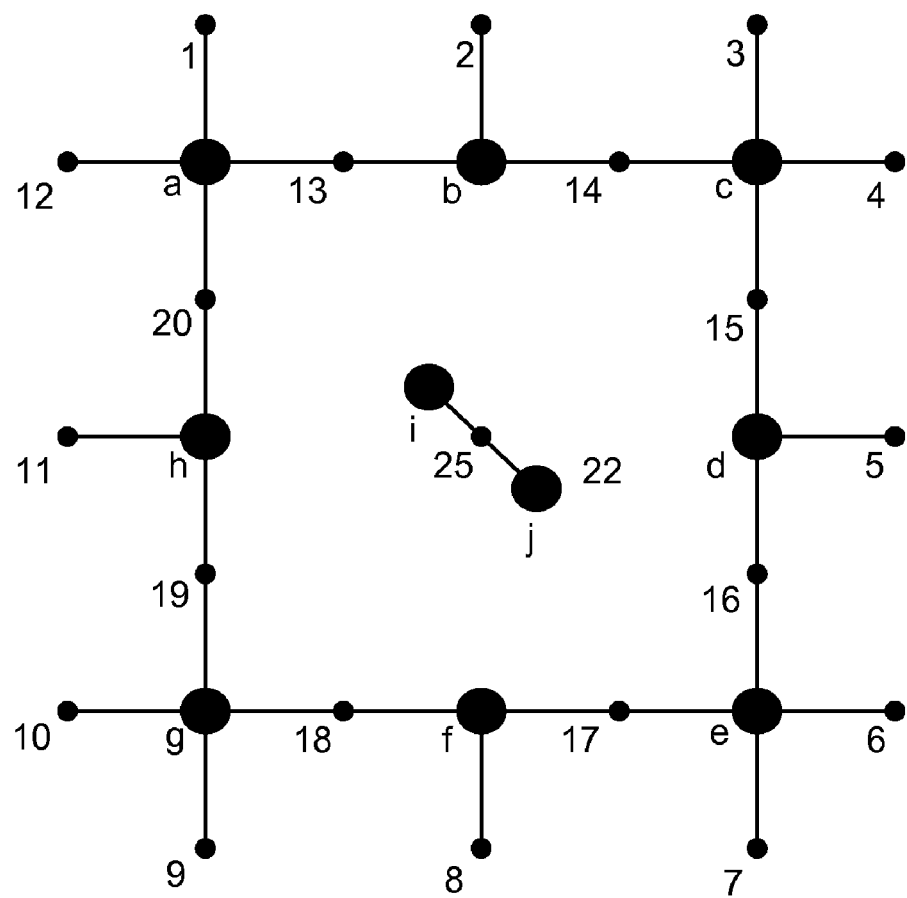
FIG. 30 shows faces separated into disjoint components, i.e., those inside the central square and those outside.

FIG. 27 illustrates a quilt of faces and edges, and FIG. 28 is a corresponding multi-level connectivity graph (MLCG) of faces (the lettered nodes) and edges (the numbered nodes). Subtracting the edge-vertex graph for the central square, as illustrated in FIG. 29, results in the graph of FIG. 30, wherein the faces are separated into disjoint components, i.e., those inside the central square and those outside.

To be precise, the subtraction operation of an MLCG A from an MLCG B involves removing all nodes in A (and arcs on those nodes) from B. This may leave B with several disconnected components. Some of the topological entities in those components may no longer be adjacent to their boundary entities (e.g. some faces will no longer be adjacent to the edges which bound those faces if those edges were in A and have therefore been removed), and so those boundary entities must be reconnected to each component to form valid MLCGs. If B is the quilt in FIG. 27 with the MLCG in FIG. 28, and A is the edge-vertex graph in FIG. 29, the result of the subtract is a graph with two component MLCGs, one component representing the inner square (two triangular faces) and one component representing the remaining 8 faces around the inner square.

Block 2602 represents the emboss operator removing edges that are connected to side faces from the connectivity graph constructed in 2600. That is, the MLCG of edges forming the intersection of a Side Face with a Part Face (and vertices incident to those edges) is subtracted (as defined in Block 2600) from the face-edge MLCG comprised of all Part Faces and the edges that bound them. This breaks the connectivity graph into components that are separated from each other by the side faces.

For each incoming face, there are two possibilities: (1) the incoming face intersects a face from the original body, or (2) the incoming face intersects no part faces.

Block 2604 is a decision block that represents the emboss operator determining whether the incoming face intersects a face from the original body. If so, control transfers to Block 2606, wherein all faces in the component containing the body face are selected as outgoing faces; that is, attributes of type "Outgoing Face" are attached to these faces.

Otherwise, control transfers to Block 2608, wherein, for each side face set, the following steps are performed.

The side faces have been split in the construction of the web body. The emboss operator finds the pieces of the side faces that are adjacent to the incoming face. These faces are known as "order-1" faces.

The emboss operator locates the edges of the order-1 faces that are also on the original solid. These edges are known as the "separation edges".

The emboss operator subtracts the edge-vertex MLCG of the separation edges (and their incident vertices) from the connectivity graph of the Part Faces constructed in Block 2600. This splits the connectivity graph into disjoint components.

Finally, the emboss operator locates the components thus created that are on the anti-normal side of the order-1 faces as measured along the separation edges, and the emboss operator marks the faces in these components as Outgoing Faces.

Cell Selection

Figure 31:
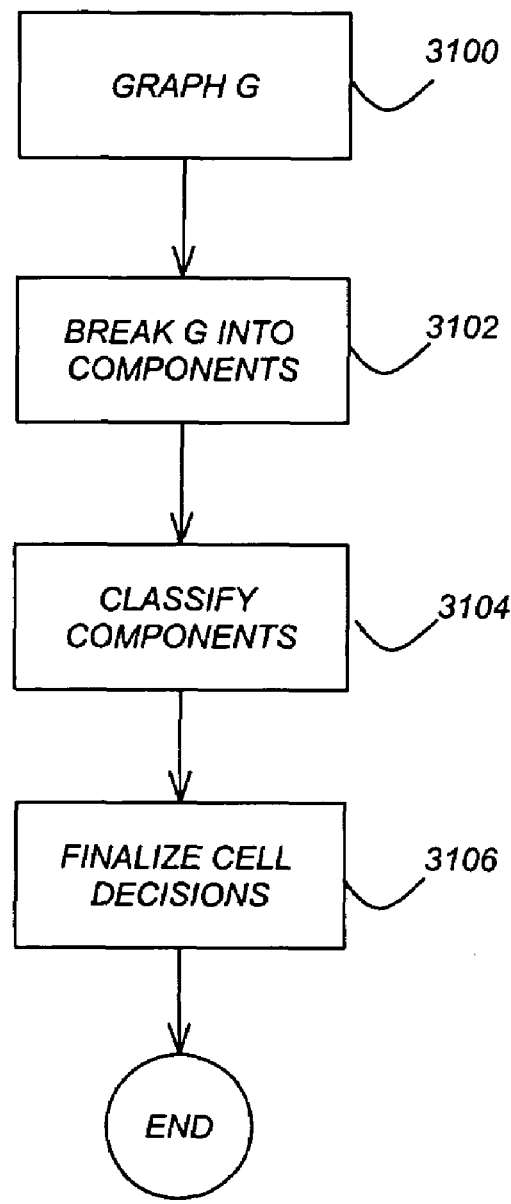

FIG. 31 is a flowchart that illustrates the logic performed according to the preferred embodiment of the present invention.

Block 3100 represents the parameters that are passed to this logic, which includes the graph G from the first stage of the selective Boolean operation.

Block 3102 represents the step of breaking the graph G into one or more components. This Block produces G/P from the graph G, wherein G/P has certain graph edges removed in order to break the graph G into components. Specifically, graph edges that represent faces marked "Part Face" (described in block 2404 of FIG. 24) on the original target body or collections of faces, at least one of which is marked "Part Face" are removed.

Block 3104 represents the step of classifying the components in the G/P into "IN" or "OUT" categories.

Note that this is performed using a meta-graph, in a manner similar to that described in U.S. Utility Patent Application Ser. No. 10/663,391, filed on Sep. 16, 2003 by Kenneth J. Hill, entitled "OPERATOR FOR SCULPTING SOLIDS WITH SHEET BODIES," which application claims the benefit under 35 U.S.C. §119(e) of co-pending and commonly assigned U.S. Provisional Patent Application Ser. No. 60/41 2,935, filed on Sep. 23, 2002, by Kenneth J. Hill, entitled "OPERATOR FOR SCULPTING SOLIDS WITH SHEET BODIES," which applications are incorporated by reference herein. Specifically, refer to the discussion associated with Block 2610 and FIGS. 27, 28, 29, 30 and 31, and the text associated with Block 2612 and FIGS. 32 and 33, in U.S. Utility Patent Application Ser. No. 10/663,391, filed on Sep. 16, 2003, by Kenneth J. Hill, entitled "OPERATOR FOR SCULPTING SOLIDS WITH SHEET BODIES," which application claims the benefit under 35 U.S.C. §119(e) of co-pending and commonly assigned U.S. Provisional Patent Application Ser. No. 60/412,935, filed on Sep. 23, 2002, by Kenneth J. Hill, entitled "OPERATOR FOR SCULPTING SOLIDS WITH SHEET BODIES," which applications are incorporated by reference herein.

Block 3106 represents the step of finalizing the cell decisions and building a final graph representing the resulting solid body. In the graphs used for this logic, graph vertices represent bounded volumes called "cells", and graph edges represent one or more model faces that separate the volumes.

For IN components, cells that have both incoming and outgoing faces are reclassified OUT. However, if the direction is not "Both," only cells on the side of the face opposite the side indicated by the direction are reclassified OUT.

For OUT components, cells which have both incoming and outgoing faces, are reclassified IN. However, if the direction is not "Both," only cells on the side of the face indicated by the direction are reclassified IN.

Once these cell decisions have been made, the final solid is constructed as the union of all the cells marked IN. This is the second stage of the selective Boolean.

Special Handling when the Direction is "Both"

When the direction is "both," the emboss operator automatically resets the direction to either normal or anti-normal depending on the first incoming face outside the original body. The direction of incoming faces inside the body is ignored.

The reason emboss behavior depends on the part of the profile outside the body is to avoid having emboss with multiple loops behave differently for each loop; if multiple loops are selected, they must behave as one unit.

In case of multiple profiles, the profile that is inside behaves as if it was connected to the ones outside, removing material only in the direction opposite to the one that adds material. This special behavior for both has been selected to better agree with user expectations; other behaviors for both are possible.

The processing is done after a selective Boolean operation subdivides the universe body using the web body, and the graph G/P has been created. (See, for example, Block 3102 above.) For each component in G/P, each node of the component is examined. If a face connecting the node with the outermost cell of the universe body is an incoming face and not an outgoing face, and the face is exterior to the target body, then the direction is set to point away from that node.

Note that this process above could leave the direction as "both" if all cells adjacent to the incoming faces are interior to the body or are adjacent to the outermost cell in the ct-graph (known as the "edge of the universe" because it surrounds all other cells in the ct-graph).

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or system for embossing and/or engraving solids in a solid modeling system could benefit from the present invention. Moreover, a computer program other than a solid modeling system could benefit from this invention.

Alternate methods of creating side faces could be used with this invention. For example, instead of side faces created with linear sweeps (with or without taper), faces tangent to the profile faces and with circular arc cross-sections could be used.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for modifying a solid body in a computer-implemented solid modeling system, comprising:
   (a) performing an operation for embossing or engraving at least one profile onto or into a solid body in the computer-implemented solid modeling system, by:
      (1) creating a cutter body,
      (2) making a target body a sheet by making all faces double-sided,
      (3) performing a non-regularized-unite of the target body and the cutter body in order to create a web body,
      (4) forming a universe body large enough to completely enclose the web body,
      (5) generating a cellular topology graph (ct-graph) from the web body and the universe body,
      (6) examining the ct-graph to determine what cells to keep and what cells to discard by performing cell culling in order to create a final graph,
      (7) creating a final body from the final graph, wherein the final body comprises the embossed or engraved solid body, and
      (8) storing or displaying the created final body.

2. The method of claim 1, wherein the web body is a collection of faces that have split each other.

3. The method of claim 1, wherein the generating of the ct-graph from the web body and universe body is a first stage of a selective Boolean operation.

4. The method of claim 3, wherein the creating of the final body from the final graph is a second stage of the selective Boolean operation.

5. The method of claim 1, wherein the final graph is a graph of cells to keep for the embossed or engraved solid body.

6. The method of claim 1, wherein an input to the operation includes the profile's faces.

7. The method of claim 6, wherein the profile's faces are marked as incoming faces.

8. The method of claim 7, wherein the cutter body is created by adding side faces around edges of the incoming faces.

9. The method of claim 8, wherein an input to the operation includes a normal, anti-normal or both direction for the incoming faces, such that (1) when the direction is normal, then the side faces are created on an anti-normal side of the incoming face, (2) when the direction is anti-normal, then the side faces are created on a normal side of the incoming face, and (3) when the direction is both, then the side faces are created on both sides of the incoming face.

10. An apparatus for modifying a solid body, comprising:
    (a) a computer; and
    (b) a solid modeling system, executed by the computer, for performing an operation for embossing or engraving at least one profile onto or into a solid body, by:
       (1) creating a cutter body,
       (2) making a target body a sheet by making all faces double-sided,
       (3) performing a non-regularized-unite of the target body and the cutter body in order to create a web body,
       (4) forming a universe body large enough to completely enclose the web body,
       (5) generating a cellular topology graph (ct-graph) from the web body and the universe body,
       (6) examining the ct-graph to determine what cells to keep and what cells to discard by performing cell culling in order to create a final graph,
       (7) creating a final body from the final graph, wherein the final body comprises the embossed or engraved solid body, and
       (8) storing or displaying the created final body.

11. The apparatus of claim 10, wherein the web body is a collection of faces that have spilt each other.

12. The apparatus of claim 10, wherein the generating of the ct-graph from the web body and universe body is a first stage of a selective Boolean operation.

13. The apparatus of claim 12, wherein the creating of the final body from the final graph is a second stage of the selective Boolean operation.

14. The apparatus of claim 10, wherein the final graph is a graph of cells to keep for the embossed or engraved solid body.

15. The apparatus of claim 10, wherein an input to the operation includes the profile's faces.

16. The apparatus of claim 15, wherein the profile's faces are marked as incoming faces.

17. The apparatus of claim 16, wherein the cutter body is created by adding side faces around edges of the incoming faces.

18. The apparatus of claim 17, wherein an input to the operation includes a normal, anti-normal or both direction for the incoming faces, such that (1) when the direction is normal, then the side faces are created on an anti-normal side of the incoming face, (2) when the direction is anti-normal, then the side faces are created on a normal side of the incoming face, and (3) when the direction is both, then the side faces are created on both sides of the incoming face.

19. An article of manufacture storing logic for modifying a solid body in a computer-implemented solid modeling system, the logic comprising:
   (a) performing an operation for embossing or engraving at least one profile onto or into a solid body in the computer-implemented solid modeling system, by:
      (1) creating a cutter body,
      (2) making a target body a sheet by making all faces double-sided,
      (3) performing a non-regularized-unite of the target body and the cutter body in order to create a web body,
      (4) forming a universe body large enough to completely enclose the web body,
      (5) generating a cellular topology graph (ct-graph) from the web body and the universe body,
      (6) examining the ct-graph to determine what cells to keep and what cells to discard by performing cell culling in order to create a final graph,
      (7) creating a final body from the final graph, wherein the final body comprises the embossed or engraved solid body, and
      (8) storing or displaying the created final body.

20. The article of claim 19, wherein the web body is a collection of faces that have split each other.

21. The article of claim 19, wherein the generating of the ct-graph from the web body and universe body is a first stage of a selective Boolean operation.

22. The article of claim 21, wherein the creating of the final body from the final graph is a second stage of the selective Boolean operation.

23. The article of claim 19, wherein the final graph is a graph of cells to keep for the embossed or engraved solid body.

24. The article of claim 19, wherein an input to the operation includes the profile's faces.

25. The article of claim 24, wherein the profile's faces are marked as incoming faces.

26. The article of claim 25, wherein the cutter body is created by adding side faces around edges of the incoming faces.

27. The article of claim 26, wherein an input to the operation includes a normal, anti-normal or both direction for the incoming face; such that (1) when the direction is normal, then the side faces are created on an anti-normal side of the incoming face, (2) when the direction is anti-normal, then the side faces are created on a normal side of the incoming face, and (3) when the direction is both, then the side faces are created on both sides of the incoming face.

* * * * *